United States Patent
Kusalich

[11] Patent Number: 5,490,649
[45] Date of Patent: Feb. 13, 1996

[54] DEVISE FOR MOUNTING, SECURING AND SUPPORTING PORTABLE POWER TOOLS HAVING BED EXTENSION ASSEMBLIES

[76] Inventor: Louis N. Kusalich, P.O. Box 541, Soquel, Calif. 95073

[21] Appl. No.: 246,109

[22] Filed: May 19, 1994

[51] Int. Cl.[6] ................................................ A47B 96/06
[52] U.S. Cl. ................ 248/214; 248/316.2; 248/222.13
[58] Field of Search .................................. 248/214, 231.3, 248/316.2, 675; 182/129, 151

[56] References Cited

U.S. PATENT DOCUMENTS

| 222,086 | 11/1879 | Slemmer | 248/225 |
|---|---|---|---|
| D. 321,117 | 10/1991 | O'Mealy et al. | |
| 4,480,810 | 11/1984 | Haii | 248/238 |
| 4,694,720 | 9/1987 | Brickner, Jr. et al. | 83/490 |

Primary Examiner—Leslie A. Braun
Assistant Examiner—Gwendolyn Wrenn

[57] ABSTRACT

The present invention enables a user to save costly time setting up and packing up a portable power tool. With the present invention, the user can disengage or engage a power tool from a sawhorse or other support surface in less than 10 seconds, with only the claws of a hammer and without requiring any other tools. It can be mounted on any 2 by 4, 2 by 6, 2 by 8, etc., on the job site when a saw horse is not feasible. It is small, weighing less than 2 pounds, and it can be carried in a carpenter's pouch or attached to the power tool. Fits all tools equipped with bed extension assemblies. It eliminates the need for a table base, saving storage and increasing room for material in truck bed.

4 Claims, 2 Drawing Sheets

DEVISE FOR MOUNTING, SECURING AND SUPPORTING PORTABLE POWER TOOLS HAVING BED EXTENSION ASSEMBLIES

BACKGROUND OF THE INVENTION

1. Field of the Invention

The invention relates in general to devices for improving the diversity of use in mounting, securing and supporting power tools having bed extension assemblies.

2. Description of the Prior Art

A number of portable power tools, particularly larger tools such as miter saws and compound miter saws, are provided with bed extension assemblies which can be attached to the tool to provide work bed extensions on either side of the tool.

Design Patent 321,117 discloses a table for use with a miter saw. In using the device of this reference, the saw can either be placed on the table, which results in an arrangement which is not too sturdy, particularly when making repetitious cuts, or the saw can be bolted to the table, which results in a bulky structure.

U.S. Pat. No. 4,694,720 shows a base for mounting a power tool such as a miter saw. The base can be attached to a support surface such as a pair of 2 by 4 members, which in turn rests on a pair of sawhorses. A plurality of cross pieces rests on the support surfaces to provide a platform which is flush with the saw and the base. This structure represents an extremely bulky approach to the provision of work surfaces for portable power tools.

SUMMARY OF THE PRESENT INVENTION

The present invention enables a user to save costly time setting up and packing up a portable power tool. With the present invention, the user can disengage or engage a power tool from a sawhorse or other support surface in less than 10 seconds, with only the claws of a hammer and without requiring any other tools.

DESCRIPTION OF THE PREFERRED EMBODIMENT

Figure 1:
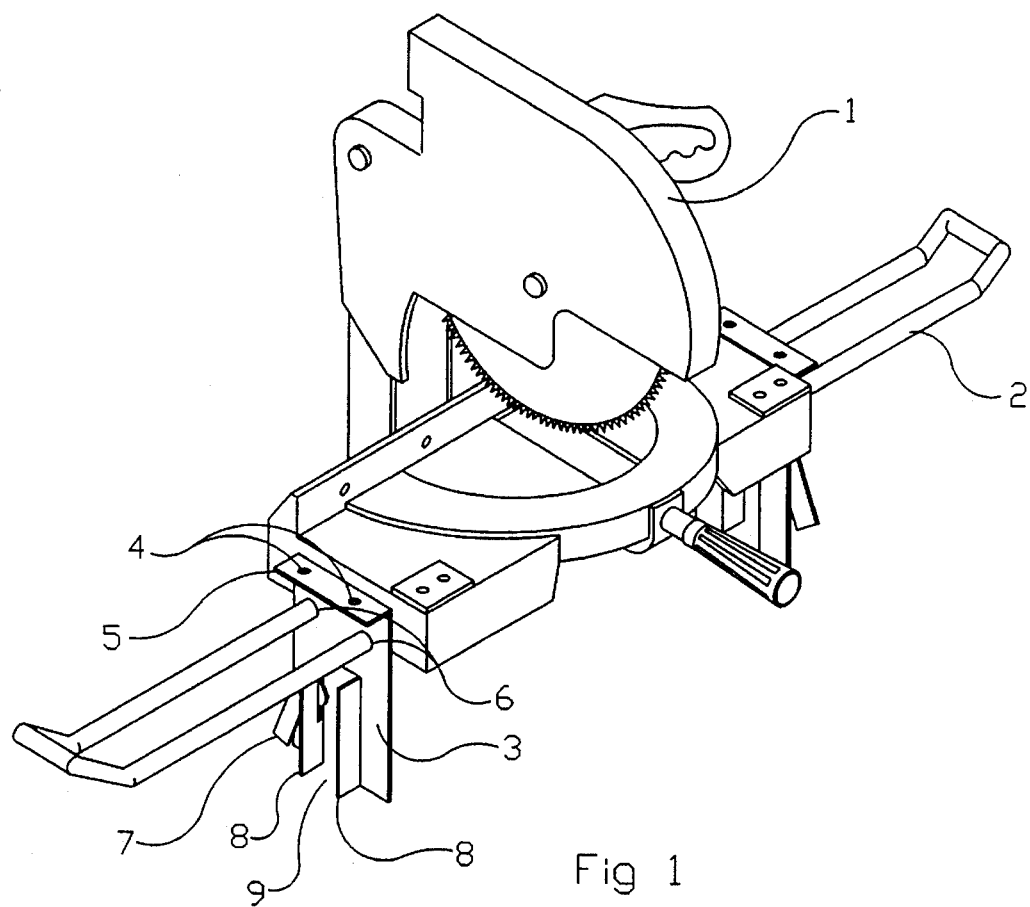
FIG. 1 is a perspective view of a power miter saw with the present invention attached thereto.

FIG. 1 shows a miter saw (1) which is provided with bed extension assemblies (2) on each side thereof. By attaching the present invention directly to the bed extension assemblies, this eliminates the need for a bulky and heavy table top altogether.

Figure 2:
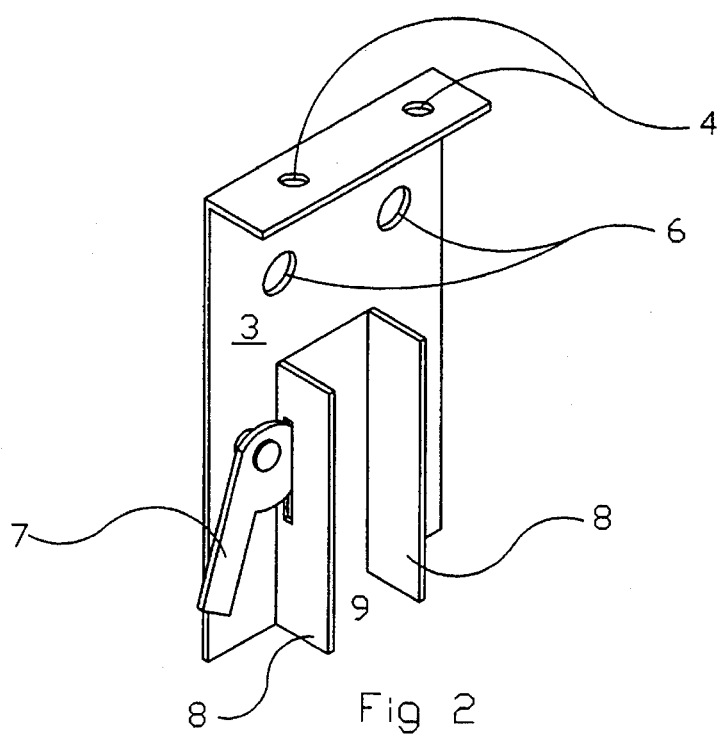
FIG. 2 is a perspective view of the attachment of the present invention.

FIG. 2 illustrates the mounting member of this invention. Two holes (4) are placed on top for versatility so someone could use them for other purposes not described. A base (5) for accessories, also gives the device a very strong structural top support. A pair of opening or holes (6) provide a two item support connected directly to the bed extensions (2) of the saw shown in FIG. 1. The locking device or lever (7) is designed so the user can cinch the invention to a monorail (FIG. 3) with the claws of a hammer, eliminating the need to make an unnecessary trip to the truck for additional tools, The flanges (8) give structural soundness and gives more surface bearing on the support surface. This will prevent the assembly from sinking in soft material. The opening or slot (9) in the lower middle permits easy installment to a support surface such as a 2 by 4, rafter or joist.

Figure 3:
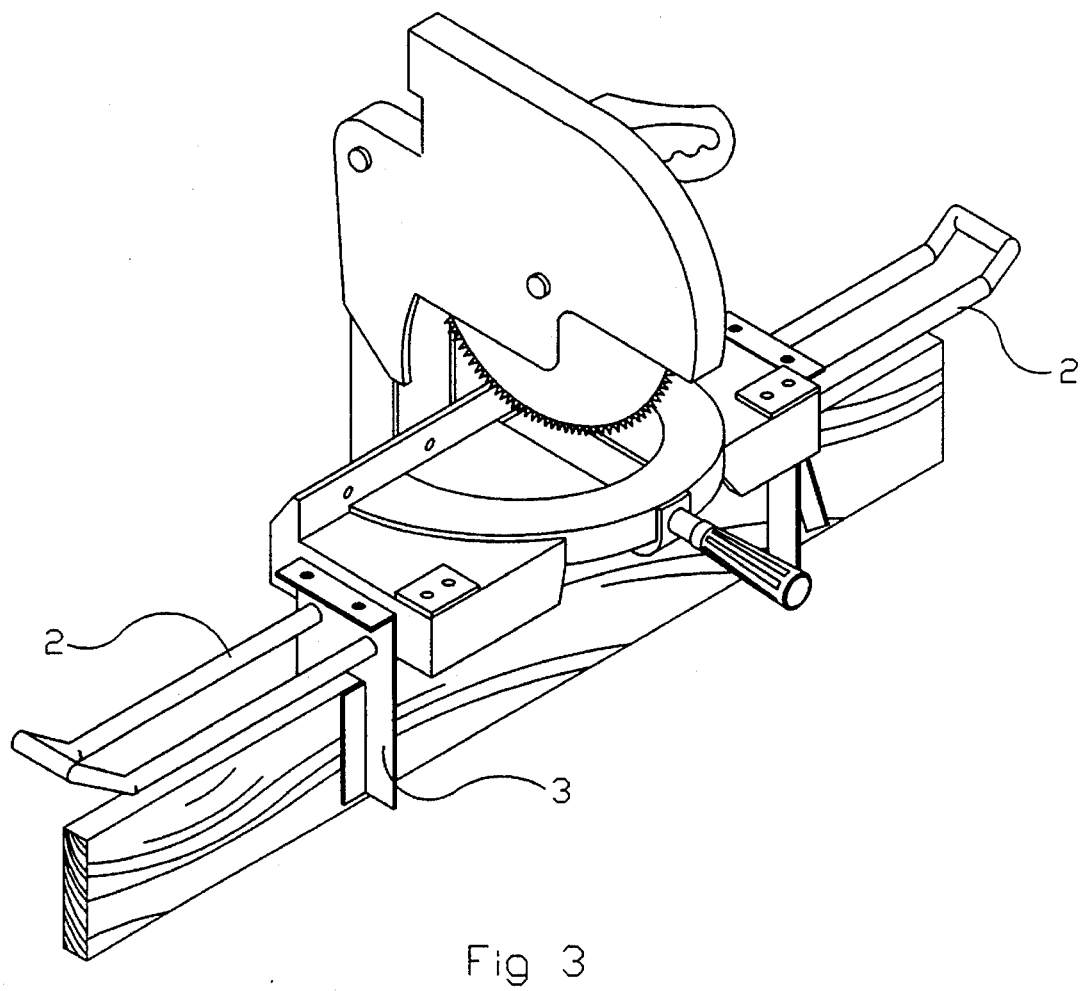
FIG. 3 is a perspective view showing an assembly including a power tool mounted with the present invention on a support surface.

FIG. 3 shows a compound miter saw with bed extensions with the invention in place and mounted on a 2 by 6.

I claim:

1. A support member in combination with a bed extension member for supporting a portable power tool, said bed extension member having a pair of legs adapted to be disposed on each side of said tool, said support member having a pair of openings through which said legs of said extension member is inserted to position said support member relative to said tool, a slot in said support member for mounting said support member on a support surface, and locking means in said support member adjacent said slot for engaging said support surface to firmly mount said support member, bed extension member and said tool to said support surface.

2. A member in accordance with claim 1 including a pair of flanges adjacent each side of said slot for further supporting said support member on said support surface.

3. A member in accordance with claim 2 in which said locking means can be inserted through an opening in one of said flanges to engage said support surface.

4. A member in accordance with claim 3 in which said locking means includes a lever which can be pivoted in one direction through one of said openings in said one of said flanges to firmly engage said support surface and can be pivoted in the other direction to disengage said locking means from said support surface.

* * * * *